C. C. Walworth.

Screw Threading Pipes.

Nº 16,414. Patented Jan. 13, 1857.

Witnesses:

Inventor:
C. C. Walworth

UNITED STATES PATENT OFFICE.

CALEB C. WALWORTH, OF BOSTON, MASSACHUSETTS.

SCREW-FEEDING GEAR.

Specification of Letters Patent No. 16,414, dated January 13, 1857.

*To all whom it may concern:*

Be it known that I, CALEB C. WALWORTH, of the city of Boston, in the county of Suffolk and State of Massachusetts, have invented a new and useful Improvement in Screw-Feeding Gear; and I do hereby declare the following to be a clear, full, and exact description of the same, reference being had to the accompanying drawings, making a part of this specification, and to the characters of reference thereon marked.

Figure 1:
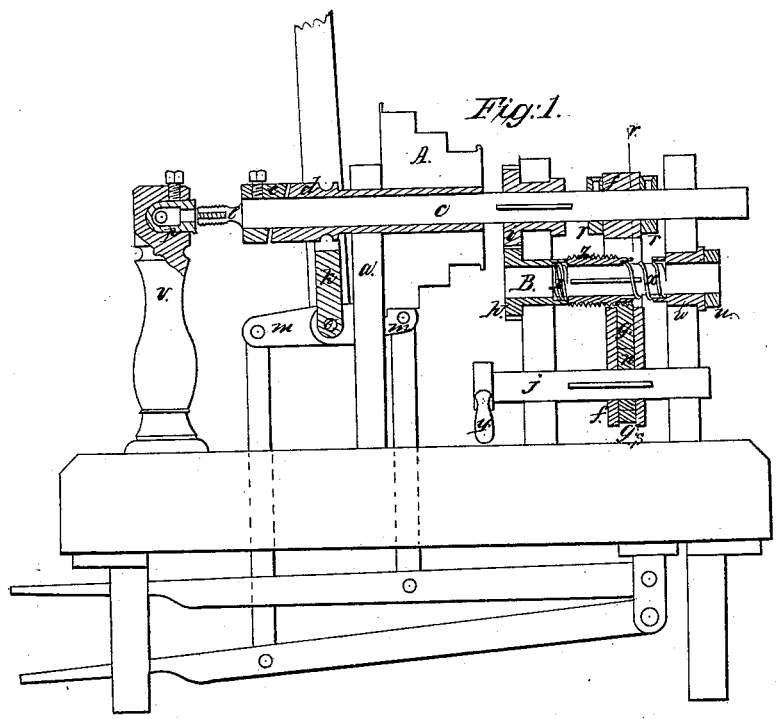
Figure 2:
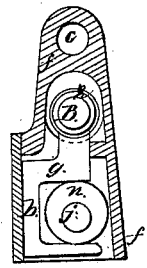
Figure 3:
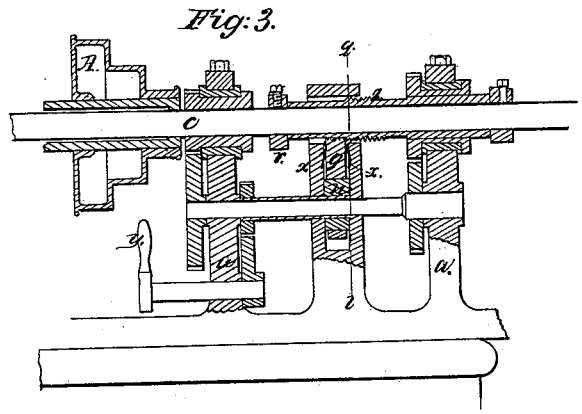
Figure 4:
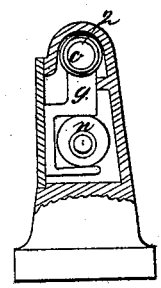

Figure 1 represents this improvement as applied to a machine for operating on pipe fittings invented by me and patented Oct. 7th, 1856 and numbered 15,860. Fig. 2 is a section on the line $s, t$, seen in Fig. 1. Fig. 3 represents a modification of the same improvement. Fig. 4 is a section on the line $l, q$, seen in Fig. 3.

My invention is particularly applicable to those cases where several feeding screws and nuts or the feeding screws and nuts of several machines are combined as in the patented machine referred to, and its nature consists in the device whereby the feeding screw or nut is allowed a movement against the action of a spring by which it is returned to a mean position when released from strain.

To enable others skilled in the art to make and use my invention I will describe its construction and operation.

($a, a$) is the framing of the machine.

($c$) is a mandrel to which is secured a tool (C), for the purpose of operating on the pipe fitting ($p$) held in the vise ($v$), and which is fed to and back from the work by the action of the feed screw ($z$).

($i$) is a gear necked into and supported in a bearing in the frame ($a$) and through which the mandrel passes; this gear is made to partake of any rotary motion of the mandrel which at the same time is allowed to reciprocate through the gear by means of the well known device of feather and spline. The gear ($i$) meshes into the gear ($h$) fixed on the screw shaft (B) which is supported and rotates in bearings in the frame, and is prevented from moving endwise by the gear ($h$) and collar ($u$). The screw ($z$) encompasses the shaft (B), while a slight endwise movement is permitted it against the springs ($x\ x$), it is connected to and rotated by the shaft B by a feather and spline; the springs ($x\ x$) are for the purpose of returning the screw ($z$) to its mean position between them when relieved from strain.

The shaft ($j$), by which the feeding gear of any combined machines may be connected, is supported in the frame and is connected by a feather and spline with the cam or eccentric ($n$); this cam and the strap ($g$) by which it is encompassed are placed within a recess in the crosshead ($f$). On the upper end of the strap ($g$) a portion of a nut is cut corresponding with the feed screw ($z$), this nut is thrown in and out of gear with the feed screw by the action of the cam on the strap caused by moving the handle ($y$) fixed on the shaft ($j$).

It is obvious that the threads of the nut and screw may not coincide, or that they may not be in such positions relative to each other as to be thrown directly into gear, but it is also obvious that pressing the V shaped threads of the nuts against those of the screw will deflect the screw to one side or the other sufficiently to secure the engagement of both.

Where the feeding screws of more than one machine are combined, as in the patented machine before mentioned, the non-engagement of one nut with its screw will prevent the engagement of all the others unless the provision herein described or its equivalent is made.

To change the relation of the advance of the mandrel ($c$) to its rotation, it is necessary either to change the gearing that rotates the screw ($z$), or else to change the screw ($z$) and nut ($g$) for others; the screw can be removed by removing the collar ($u$) and box ($w$), the strap ($g$) can be removed after removing the cover ($b$) from the crosshead. The crosshead ($f$) is reciprocated by the connection of the strap ($g$) therewith, and reciprocates the mandrel through the collars ($i, i$) by which it is adjusted with relation to the crosshead and the fitting ($p$).

It is evident that a movement against the action of springs can be permitted to the nut as well as to the screw as illustrated by Figs. 3 and 4 without departing from the principle of my invention; I wish therefore to be understood that I do not confine myself to either method herein described exclusively.

What I claim as new, and desire to secure by Letters Patent, is—

The combination of a feeding screw or nut, arranged so as to have an endwise movement, with springs, for the purpose of insuring the engagement of the screw and nut, and returning either of them to a mean position when released from strain.

C. C. WALWORTH.

Witnesses:
P. E. TESCHEMACHER,
J. B. CROSBY.